Feb. 27, 1923.
T. E. BARNUM
1,446,443
CONTROLLER FOR ELECTRIC MOTORS
Filed May 5, 1919
2 sheets-sheet 2
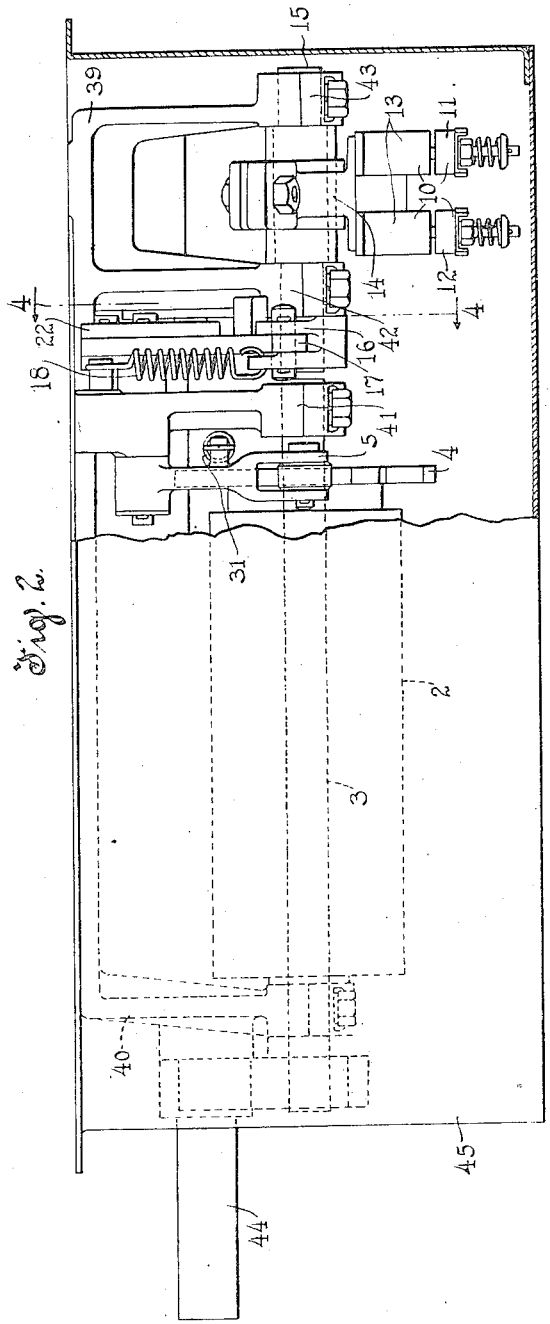
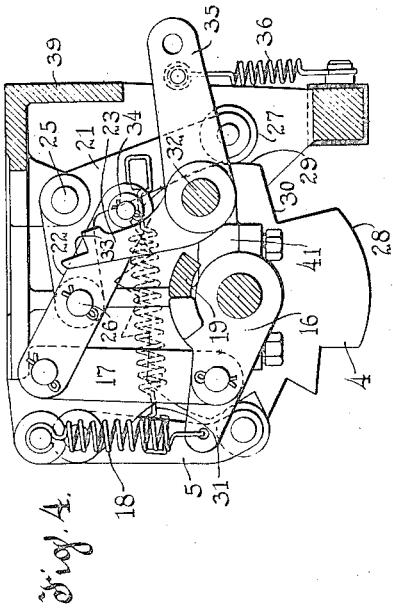
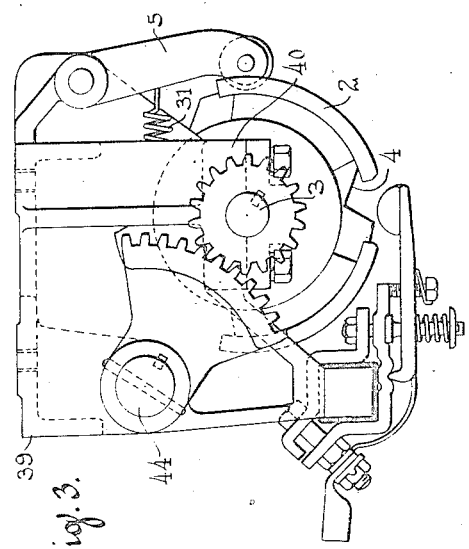
INVENTOR.
Thomas E. Barnum
BY Frank H. Hubbard
ATTORNEY Patented Feb. 27, 1923.

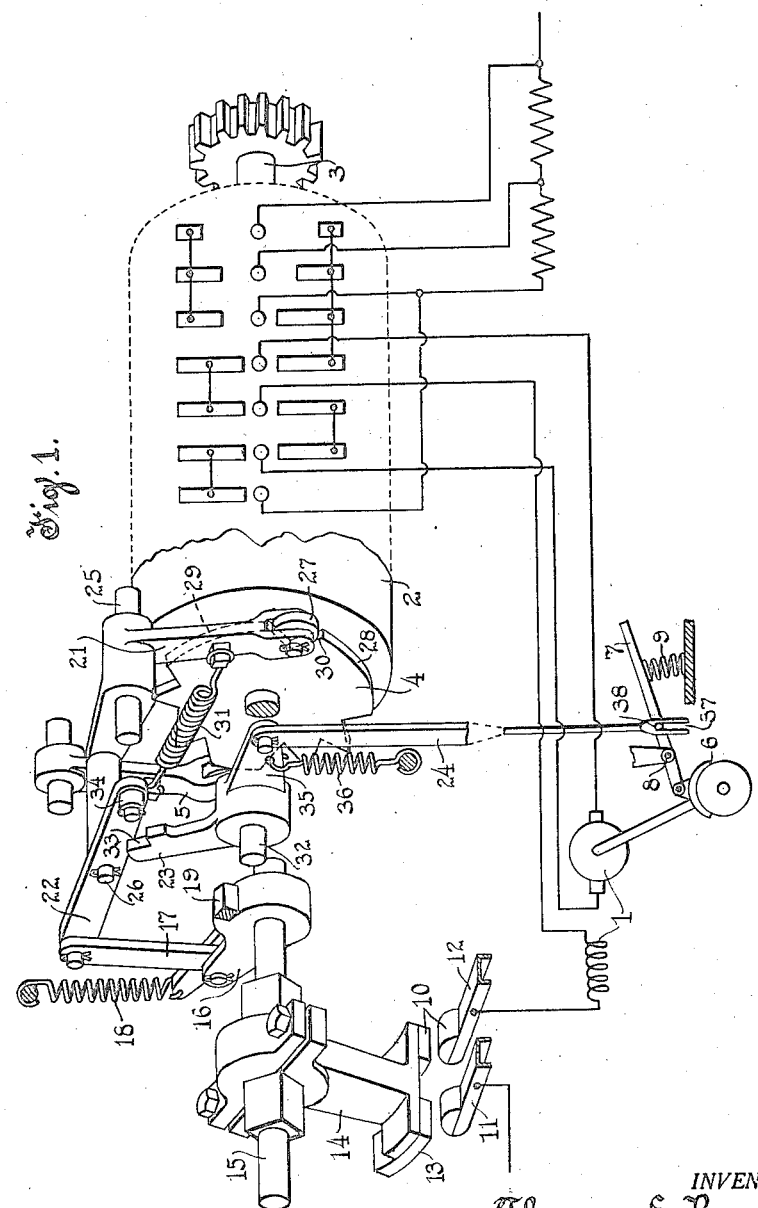

1,446,443

UNITED STATES PATENT OFFICE.

THOMAS E. BARNUM, OF MILWAUKEE, WISCONSIN, ASSIGNOR TO THE CUTLER-HAMMER MFG. CO., OF MILWAUKEE, WISCONSIN, A CORPORATION OF WISCONSIN.

CONTROLLER FOR ELECTRIC MOTORS.

Application filed May 5, 1919. Serial No. 294,898.

*To all whom it may concern:*

Be it known that I, THOMAS E. BARNUM, a citizen of the United States, residing at Milwaukee, in the county of Milwaukee and State of Wisconsin, have invented new and useful Improvements in Controllers for Electric Motors, of which the following is a full, clear, concise, and exact description, reference being had to the accompanying drawing, forming a part of this specification.

This invention relates to controllers for electric motors, and while not limited thereto, is particularly applicable to the control of motors operating industrial trucks and the like.

One object of the invention is to provide a controller for the aforesaid purpose including the usual control elements and cooperable means for positively preventing completion of the motor circuit except under conditions of suitable resistance protection and under predetermined operative conditions of the driven device.

Another object is that of providing in a controller for a motor equipped with speed control means and mechanically operated braking means, a safety switch so interlocked with such control and braking means as to insure opening of said switch prior to setting of the brake and to prevent closure of said switch until after release of the brake and movement of said control means to off position.

Another object is that of providing a controller of the character stated, including means for effecting automatic stopping and braking of the controlled motor in case the same is left unattended through inadvertence or otherwise and preventing restarting thereof except following the aforestated positioning of the brake and controller parts.

Other objects and advantages will hereinafter appear.

The accompanying drawing illustrates one of the embodiments which the invention may assume in practice and the same will now be described, it being understood that the apparatus illustrated is capable of modifications falling within the scope of the appended claims.

In the drawing,

Figure 1 is a perspective view of the apparatus, certain parts being illustrated schematically and diagrammatically;

Fig. 2 is a side elevational view thereof;

Fig. 3 is an end view of the same from the left; while

Fig. 4 is a sectional view substantially on line 4—4 of Fig. 2.

Referring to the drawing, and particularly to Fig. 1 thereof, the same illustrates a reversible electric motor 1 of the type ordinarily employed in truck service and a drum controller 2 to effect starting, stopping and reversal of the motor and acceleration thereof in either direction through resistance variation in the usual manner. Said drum controller is mounted upon a shaft 3 having a star-wheel 4 to be engaged by a pawl 5 and is movable in opposite directions from an intermediate off position to effect starting of the motor with the total resistance in circuit. The motor is also provided with a mechanically operated brake 6 having an operating lever 7 fulcrumed at 8 and being in practice integral with or connected to a section of the operator's platform of the truck, whereby the weight of the operator serves to hold the brake released. A spring 9 serves to bias said lever to brake setting position.

In addition to the foregoing essentially conventional features there is provided a safety switch 10 in circuit with the motor, said switch having operating means to be hereinafter described in detail, for subjecting the same to operation and control by said drum controller and said brake jointly, said switch and the operating means therefor coacting to insure the aforestated co-ordinated action of said drum controller and said brake.

The switch 10 comprises a pair of relatively stationary contacts 11 and 12 adapted to be bridged by a movable contactor 13 carried by an arm 14 which is rigidly secured to and supported by a rocking shaft 15, the latter being preferably arranged in coaxial relation with the drum shaft 3 as illustrated. Said shaft 15 is provided with a rigidly secured operating arm 16 which is connected by a link 17 with the operating mechanism. A spring 18 connected to said arm 16 serves thereby to bias the contactor 13 out of engagement with said stationary contacts, while a stop 19 serves to limit movement of the contactor in response to such bias.

Said operating mechanism includes a bell crank lever 21 adapted to be rocked upon movement of the drum 2 in either direction from the off position illustrated and a second lever 22 connected with the switch actuating link 17 and pivotally mounted upon the lever 21 to form therewith a collapsible toggle connection. Further it includes a releasable latch 23 for preventing collapse of such toggle connection and thereby adapting the same to transmit movement of the lever 21 to the link 17 for effecting closure of safety switch 10. A push link 24 serves to connect said latch with the brake lever 7 to provide, upon biased movement of the latter, for tripping of the latch with consequent collapse of the toggle connection and opening of said switch under the action of the spring 18.

More specifically, the bell crank lever 21 has a fixed pivotal support 25 and carries at the end of one of its arms a laterally projecting stud 26 providing the pivotal support for the lever 22 while its other arm carries a roller 27 adapted to co-operate with the star wheel 4 of the drum controller. Said star wheel is provided with extended equi-radial arc surfaces 28 and 29 and an intermediate notch 30, the latter being adapted to receive the roller 27 when the drum is in off position, whereas upon movement thereof in either direction from such position, said roller is forced radially of the star wheel thereby rocking the bell crank lever 21 about its pivot. Each of the arc segments 28 and 29 is moreover of sufficient length to insure retention of the roller in such radially displaced position throughout the normal rotation of the drum in either direction. In practice the roller 27 is preferably arranged substantially diametrically opposite the corresponding element of the pawl 5, whereby said bell crank lever 21 and said pawl may be connected by a single spring 31 for biasing both of said elements toward the star wheel, said spring obviously opposing the aforedescribed rocking movement of the bell crank lever 21.

The latch 23 is pivotally mounted upon a fixed stud 32 and provided with a notch 33 adapted to engage a stud 34 carried by the free end of the lever 22, said latch being provided with an angularly extending arm 35 connected to the push link 24. A spring 36 furthermore connects said arm 35 with a fixed point for biasing the latch toward its position of engagement with the stud 34. The lower end of said push link 24 is provided with a slot 37 adapted to engage a pin 38 carried by the brake lever 7, the length of said slot being such as to insure abutment of the pin against the upper end of the slot for tripping of the latch 23 upon upward movement of the brake lever through substantially one-half of its range and prior to setting of the brake thereby.

Following such tripping of the latch and consequent collapse of the toggle connection for release of the switch 10 while the drum controller is in any running position, the spring 18 serves by means of the link 17 to maintain the lever 22 tilted out of its operative position thereby preventing re-engagement of the stud 34 by the latch 23 upon subsequent release of the brake. However, upon return movement of the drum controller to off position, the spring 31 forces the roller 27 into the slot 30 thereby straightening the toggle connection and permitting engagement of the stud 34 within the notch 33 of latch 23, provided the brake is held fully released or is brought to such position while the drum controller is retained in off position.

In Figs. 2 to 4, which illustrate certain details of the device as constructed in practice, the aforedescribed controller parts are supported in operative relation by a frame 39 having integral or rigidly secured brackets 40, 41, 42 and 43, carrying aligned bearings. The drum shaft 3 is journaled within the bearings of brackets 40 and 41, and the rocking shaft 15 of the safety switch 10 is journaled within the bearings of brackets 42 and 43. An operating shaft 44 geared to the drum shaft 3 is furthermore supported by the bracket 40 while the pawl 5 and bell crank lever 21 are pivotally mounted upon suitably located studs projecting from one side of the bracket 41, the latch 23 and the spring 18 being similarly carried upon the opposite side of said bracket. The fixed contacts 11 and 12 of the safety switch are mounted upon a support of conventional character carried by suitable extensions of the brackets 42 and 43 and are adapted to make resilient engagement with the contactor 13. The aforedescribed parts are enclosed within a suitable housing 45 secured to the frame 39, the operating shaft 44 projecting outside said housing to provide for actuation of the controller.

While the mode of operation of the device as a whole is believed to be apparent from the foregoing description, nevertheless the same may be briefly stated as follows: The drum controller being in the off position illustrated, the brake lever 7 is depressed and held, thereby releasing the brake and permitting the latch 23 to move into engagement with the stud 34 under the action of the spring 36. The toggle connection being now set, the drum controller is moved in one or the other direction to a starting position, during which movement the star wheel 4 rocks the bell crank lever 21, such motion being transmitted by the lever 22 to the link 17 for closure of the switch 10. The drum controller may now be advanced for accelerating the motor without in any wise affecting said safety switch.

If at any subsequent time the brake lever 7 is released the latch 23 is at once tripped and the safety switch thereby opened for de-energizing the motor prior to setting the brake in the manner aforedescribed. Moreover, following such action, the motor can be restarted only after the brake lever 7 has been fully depressed and the drum controller returned to off position.

What I claim as new and desire to secure by Letters Patent is:

1. In a controller for an electric motor, the combination with a mechanically operated brake and a drum controller for said motor, of a line switch in circuit with said drum controller and said motor, means for effecting closure of said switch through operation of said drum controller and means for rendering said former means inoperative so long as said brake remains set.

2. In a controller for an electric motor, the combination with a mechanically operated brake for said motor and a drum controller interposed between said motor and the line, of a switch controlling the line connection of said drum controller, means for effecting closure of said switch upon movement of said drum controller to circuit closing position and means rendering said former means inoperative pending release of said brake.

3. In a controller for an electric motor, the combination with a mechanically operated brake for the motor and a drum controller interposed between the motor and the line and positionable for stopping of the motor and starting thereof in either direction, of a switch controlling the line connection of said motor, means for effecting closure of said switch upon movement of said drum controller in either direction to starting position and means rendering said former means inoperative pending release of said brake.

4. In a controller for an electric motor, the combination with a mechanically operated brake for the motor and a drum controller interposed between the motor and the line and movable in opposite directions from an off position to effect starting of the motor to either direction under resistance protection, of a line switch in circuit with said drum controller, means dependent upon movement of the drum controller from its off position for effecting closure of said switch and means rendering said former means inoperative pending release of said brake.

5. In a controller for an electric motor, the combination with a mechanically operated brake for the motor and a drum controller interposed between the motor and the line and movable in opposite directions from an off position to effect starting of the motor in either direction under resistance protection, of a line switch in circuit with said drum controller, means dependent upon movement of the drum controller from its off position for effecting closure of said switch and means for causing opening of said switch prior to setting of said brake and for rendering said former means inoperative to effect closure of said switch except during maintenance of said brake in released position.

6. In a controller for an electric motor, the combination with a mechanically operated brake for the motor and a drum controller interposed between the motor and the line, of a line switch in circuit with said drum controller and operating means for said switch including a toggle connection to be actuated for effecting closure of said switch upon movement of said drum controller and means insuring collapse of said toggle connection upon setting of said brake.

7. In a controller for an electric motor, the combination with a mechanically operated brake for the motor and a drum controller interposed between the motor and the line, of a switch controlling the line connection of said motor and operating means for said switch including a toggle connection operatively associated with said switch, a releasable latch for maintaining said toggle connection set, means carried by said drum controller for actuating said toggle connection to cause closure of said switch upon movement of said drum controller to running position and means insuring tripping of said latch prior to setting of said brake.

8. In a controller for an electric motor, the combination with a mechanically operated brake for the motor and a drum controller interposed between the motor and the line, of a switch controlling the line connection of said motor and operating means for said switch including a toggle connection operatively associated with said switch, a releasable latch normally maintaining said toggle connection set, a star wheel carried by said drum controller for actuating said toggle connection when in set relation and means to act prior to setting of the brake for tripping said latch and maintaining the same tripped pending release of said brake.

9. In a controller for an electric motor, the combination with a mechanically operated safety device for the motor and a drum controller positionable for stopping of the motor and starting thereof in either direction, of a switch controlling the line connection of said motor, means for effecting closure of said switch upon movement of said drum controller in either direction to starting position and means rendering said former means inoperative pending predetermined operation of said safety device.

10. In a controller for an electric motor, the combination with a mechanically operated safety device and a circuit controlling drum for the motor, of a switch controlling the line connection of the motor, said switch being biased to open position, and means providing for closure of said switch upon predetermined actuation of said drum, said means being dependent for its operation upon predetermined setting of said safety device.

In witness whereof, I have hereunto subscribed my name.

THOMAS E. BARNUM.